Figure 1:
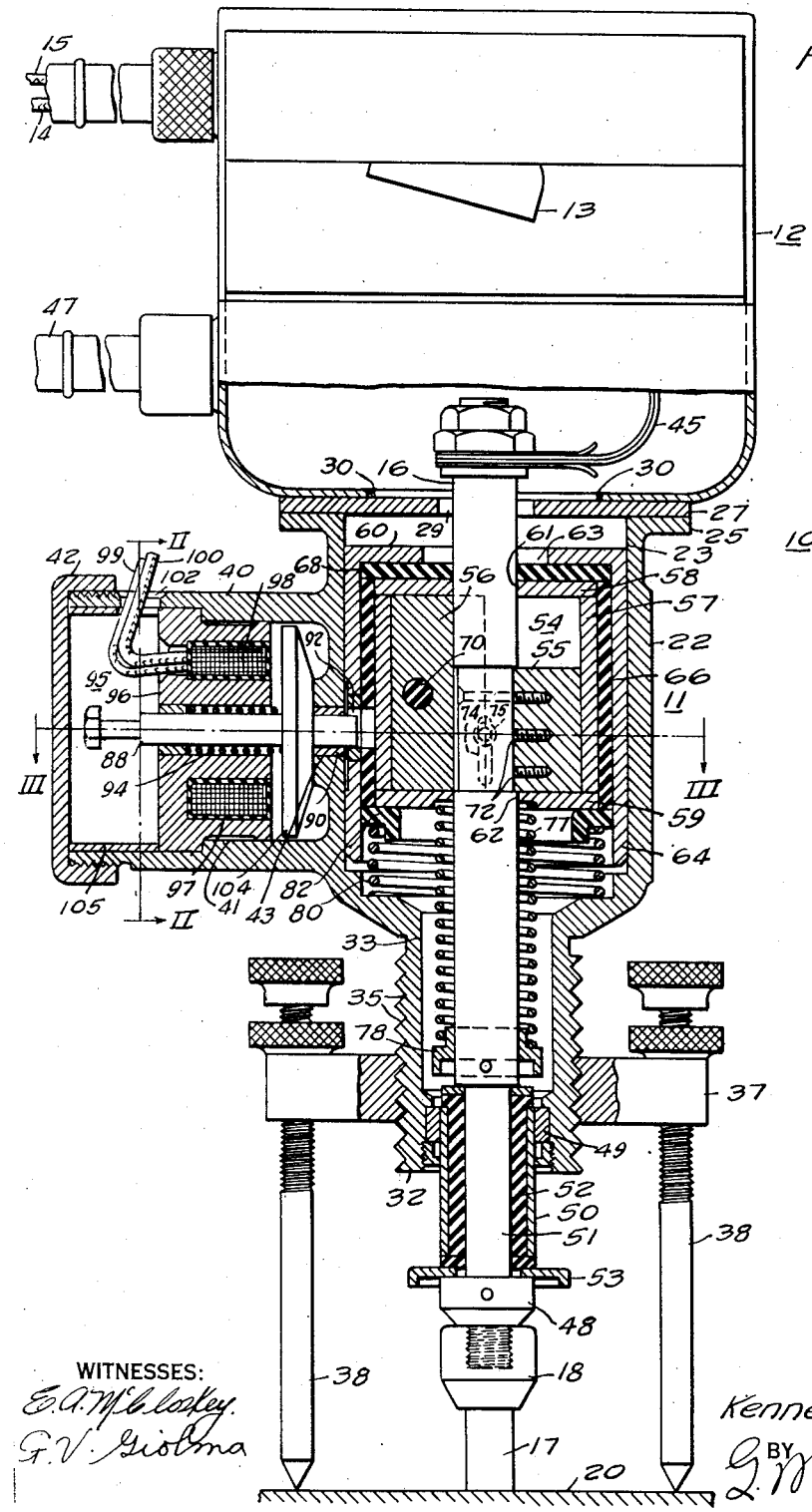

April 19, 1949. K. F. BARLOW 2,467,723
STUD WELDING APPARATUS
Filed April 19, 1947 2 Sheets-Sheet 1

WITNESSES:
E. A. McCloskey.
G. V. Giolma

INVENTOR
Kenneth F. Barlow.
BY
G. M. Crawford
ATTORNEY

April 19, 1949.　　　　K. F. BARLOW　　　　2,467,723
STUD WELDING APPARATUS
Filed April 19, 1947　　　　2 Sheets-Sheet 2
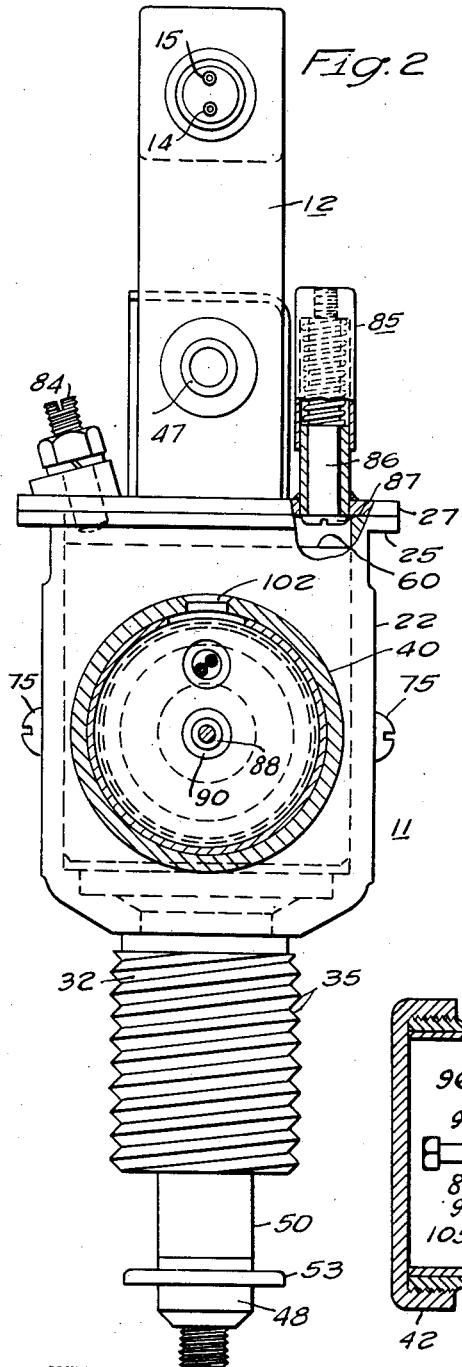
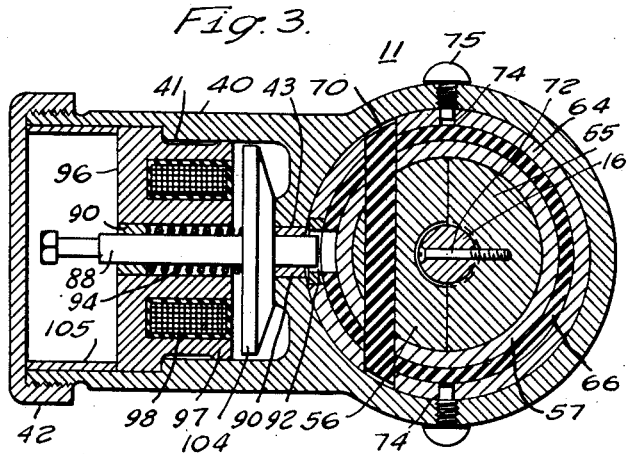
WITNESSES:
INVENTOR
Kenneth F. Barlow.
ATTORNEY Patented Apr. 19, 1949

2,467,723

UNITED STATES PATENT OFFICE 2,467,723

STUD WELDING APPARATUS

Kenneth Frederick Barlow, Preston, England, assignor to The English Electric Company Limited, London, England, a British company Application April 19, 1947, Serial No. 742,666
In Great Britain May 17, 1946

10 Claims. (Cl. 219—4)

My invention relates, generally, to stud welding apparatus, and it has reference in particular to apparatus of the type used for arc welding studs, rivets and the like, to metal plates or other such members.

Generally stated, it is an object of my invention to provide an improved stud welding gun which is simple and inexpensive to manufacture, and which is easy to use.

More specifically, it is an object of my invention to provide a welding gun having a movable stud support for positioning a metal stud relative to a workpiece, passing current therethrough, and retracting it therefrom to draw an arc, and subsequently forcing it into engagement with the workpiece to effect a weld therewith.

It is also an object of my invention to provide, in a stud welding gun, for magnetically locking a stud supporting spindle relative to a movable sleeve which is releasable in predetermined relation to the flow of welding current for drawing an arc between the stud and a workpiece.

Another object of my invention is to provide for retaining a movable stud supporting member in predetermined relation to a movable sleeve by reason of welding current flowing through the member.

Yet another object of my invention is to provide for retaining a clutch device in a stud welding gun in a predetermined position prior to initiating a flow of welding current, and subsequently retracting it to draw an arc between the stud and a workpiece to which the stud is to be welded.

It is an important object of my invention to provide for biasing a clutch device for a movable stud support away from a workpiece, and for retaining it against movement in response to the biasing force until a predetermined time in a welding cycle.

A further object of my invention is to provide for using a magnetically retractable pawl for retaining a stud support clutch device in a predetermined position relative to a workpiece, and for releasing it in predetermined relation to a flow of current between the stud and the workpiece.

Other objects will, in part, be obvious and will, in part, be explained hereinafter.

In accordance with one embodiment of my invention, a stud supporting spindle is axially movable in, and is insulated from, the housing of a welding gun, and is connected to a source of electrical energy through a suitable timing device controlled by a switch in the handle of the gun.

The spindle passes through an axially movable sleeve positioned within the housing and containing magnetic clutch elements which lock the spindle and the sleeve in fixed relation with each other whenever welding current flows through the spindle. The sleeve is normally biased away from the workpiece, and is actuated by means of a push button to a depressed position in which it is retained by a slidable pawl. The pawl is retracted magnetically in timed relation to the initiation of the welding operation to release the sleeve and permit the spindle to retract and draw an arc between the stud and the workpiece. Upon cessation of the flow of welding current, the clutch elements release the spindle, which is biased toward the workpiece, to force the stud into welded relation therewith.

For a more complete understanding of the nature and scope of my invention, reference may be made to the following detailed description, which may be studied in connection with the accompanying drawings, in which:

Figure 1 is a side elevational view, partly in section of a stud welding gun embodying the invention in one of its forms, Fig. 2 is a sectional view taken along the line II—II of Fig. 1 with the supporting stand and stud holding chuck removed, Fig. 3 is a sectional view taken along the line III—III of Fig. 1, and Fig. 4 is a diagrammatic view of a stud welding system showing the general arrangement of elements, and the electrical connections of the welding gun.

Referring generally to Figures 1 through 4, the reference numeral 10 may denote a stud welding gun comprising a housing 11 having a stirrup-like handle 12 at the upper end with a control switch 13 incorporated therein, for controlling a timing device (shown in Fig. 4) through a cable comprising conductors 14 and 15 to connect a movable spindle 16 to a suitable source of electrical energy for welding a stud 17, which may be positioned in a chuck 18 on the end of the spindle, to a workpiece 20.

Referring to Figs. 1 through 3, it may be seen that the housing 11 may comprise a substantially cylindrical body portion 22 having a cylindrical bore 23 of substantially uniform cross-section therein. A flange 25 at the upper end of the body portion 22 provides means for securing to the housing a removable cover plate 27 which has a central opening 29 sufficiently large to provide clearance for the spindle 16. The handle 12 may be secured to the cover plate 27 in any suitable manner such as by means of welds 30.

The other end of the body portion 22 may be provided with an extension 32 of reduced cross-section, having an internal bore 33 which is coaxial with, but of less diameter than, the bore 23 of the body portion, and which may be provided with external threads 35 for receiving a tripod support 37 having legs 38 threadedly secured therein for engaging the workpice 20. A cup-shaped receptacle 40 may be provided on one side of the body portion 22 having a recess 41 therein and provided with a threaded cap 42. The recess 41 may connect with the bore 23 through an opening 43 therebetween.

The spindle 16 may comprise a rod-like element and may be connected to a source of electrical energy by means of a flexible shunt 45 attached to the upper end and positioned within the handle 14, where it may connect to a cable 47 for making connections to a source of welding current through a suitable timing device as shown in Fig. 4. The spindle may be slidably supported in the housing 11 by means of a bearing ring 49 positioned within the lower end of the extension 32 for engaging a bearing member 50 on the spindle. The bearing member 50 may comprise a cylindrical sleeve of brass or the like, mounted on a reduced end portion 51 of the spindle 16 by means of an insulating bushing 52, so as to electrically insulate the spindle from the housing 12. A disked deflector 53 may be positioned adjacent the bearing member to protect it from being splashed by molten weld metal. The bearing member and the deflector may be retained by a collar 48 threadedly secured on the end portion 51.

Within the body portion 22 of the housing, a clutch device 54 may be provided for retaining the spindle in different predetermined operating positions during a welding operation, and for releasing it upon the termination of the flow of welding current. The clutch device 54 may, for example, comprise a pair of complementary clutch members 55 and 56 of magnetic material which may be semi-cylindrical in cross-section, and positioned on opposite sides of the spindle within a clutch retainer comprising an inner metal sleeve 57 having end covers 58 and 59 with aligned openings 61 and 62 to permit movement of the spindle 16 therethrough. The sleeve 57 may be positioned within an outer sleeve or cup 64 which fits slidably within the bore 23 of the housing, and has a flange 69 at the upper end defining a central opening 63 for the spindle 16. The sleeve 57 and the sleeve 64 may be electrically insulated from each other by means of an insulating bushing 66 and an insulating washer 68.

The clutch member 56 may be of substantially the same length as the interior of sleeve 57 and may be secured to the sleeve by means of a transverse pin 70 of insulating material. The clutch member 55 may be substantially shorter than the interior length of the sleeve 57 and may be secured to the spindle 16 by means of screws 72 so as to be movable up and down in the sleeve 57 with the spindle 16. Longitudinal slots 74 may be provided on opposite sides of the outer sleeve 64 for receiving set-screws 75, so as to permit only longitudinal movement of the spindle and sleeves relative to the body 22 of the housing.

A helical spring 77 may be positioned about the spindle 16 in conjunction with a collar 78 attached to the spindle for normally biasing the spindle toward the workpiece relative to the clutch device. A spring 80 may be provided within the lower end of the bore 23 in conjunction with an insulating washer 82, for normally biasing the clutch device 54 against an adjustable stop 84 in the cover plate 27. A spring-retrieved push button 85 having a movable plunger 86 with a head 87 for engaging the flange 69 of the sleeve 64, may be provided for depressing the clutch device 54 toward the workpiece against the force of the spring 80.

In order to provide for initiating an arc between the stud 17 and the workpiece 20, means such as the slidable pawl 88 may be provided for initially retaining the clutch device 54 in the depressed position. The pawl may be positioned within the receptacle 40 so as to project through a bushing 90 in the transverse opening 43, into a recess 92 in the outer sleeve 64 of the clutch device. The recess 92 may be so positioned as to retain the clutch device 54 depressed in substantially its lowermost position. The stop 84 may be adjusted to vary the movement of the clutch device 54 for drawing the correct length of arc when the clutch device is released. The pawl 88 may be retracted against the operating force of a spring 94 by electromagnetic means 95 comprising a core member 96 having an annular recess 97, within which may be positioned a coil 98 having leads 99 and 100 extending therefrom through an opening 102 in receptacle 40. The pawl 88 may be provided with a disk-type armature 104 disposed to be attracted to the core 96. The core member may be retained in the recess by a retainer ring 105 engaging the cap 42.

In operation, the push button 85 may be depressed to actuate the clutch device 54 downwardly to the position in which the pawl 88 is forced by the spring 94 into the recess 92 of the outer sleeve 64, whereby the sleeve is locked in a depressed position against movement in response to the biasing force of the spring 80. A stud 17 is then positioned in the chuck 18 and the gun is then pressed against the workpiece 20, thus forcing the spindle 16 upwardly through the body of the housing 11 and through the clutch device 54 until the legs 38 of the tripod engage the workpiece 20.

The control switch 13 is thereupon actuated to operate the timer 106 through conductors 14 and 15 to connect the spindle 16 to one terminal of a source of electrical energy through the flexible shunt 45, cable 47 and timer 106, as shown in Fig. 4. The workpiece 20 may be connected to the other terminal of the source by a suitable conductor 107, either through the timer 106, or independently thereof. As soon as current flows through the spindle, the clutch members 55 and 56 are magnetically attracted to each other and lock the spindle and clutch device 54 in fixed relation.

A predetermined time after the connection of the spindle 16 and workpiece 20 to the source, the coil 98 of the electromagnetic means 95 is energized through conductors 99, 100 and the timer 106 to retract the pawl 88. The clutch device 54 is thereupon actuated by the spring 80 toward the upper end of the housing 11 until it engages the adjustable stop 84. Since the clutch members 55 and 56 are mutually attracted to each other because of the magnetic fields surrounding the spindle 16, the spindle will be retained in fixed relation with the outer sleeve 64 so long as welding current continues to flow through the spindle. Accordingly, the spindle 16 is withdrawn from the workpiece 20 until the sleeve 64 engages the stop 84, and an arc is drawn between the workpiece and the end of stud 17.

A predetermined time after the initiation of the flow of welding current by the timer 106, the welding current is interrupted thereby. The spindle 16 will thereupon be released from its fixed relation with the outer sleeve 64 of the clutch device. Accordingly, the spring 77 will now be effective to move the spindle toward the workpiece. The end of the stud 17 is thereupon forced into the pool of molten metal formed on the workpiece by the arc, and is welded to the workpiece. The gun may thereupon be withdrawn from the work, removing the stud 17 from the chuck 18, and the above cycle may be repeated to perform another stud welding operation.

From the above description and the accompanying drawings, it will be apparent that I have provided in a simple and effective manner for welding studs, rivets and the like to other metallic members. The length of the arc it is desired to draw may be easily adjusted by varying the position of the adjustable stop in the cover plate of the housing. The time of release of the clutch device to initiate the arc may be varied, relative to the initiation of the flow of welding current under the control of the timer, which may be of any suitable construction. By providing for magnetically locking the stud supporting spindle in response to the flow of the welding current through the spindle, a simple and effective clutch mechanism is provided, which requires little or no maintenance. A welding gun embodying the features of my invention is simple and inexpensive to manufacture and is reliable and efficient in operation.

Since certain changes may be made in the above-described construction, and different embodiments of the invention may be made, such as using a device without the handle as a part of a machine in which the movement may be affected by means of a handle lever or a pedal against an upward biasing force due to a spring or gravity, or by a fluid pressure operated device, without departing from the spirit or scope thereof, it is intended that all of the matter contained in the above description and shown in the accompanying drawings, shall be considered as illustrative, and not in a limiting sense.

I claim as my invention:

1. A stud welding gun comprising, a housing having a substantially cylindrical body portion with a reduced extension at one end, a sleeve slidably positioned within the cylindrical body portion, springs means biasing the sleeve relative to the body portion, clutch means positioned within the sleeve, a spindle projecting from the reduced extension passing through the sleeve for engagement by the clutch means, and additional spring means biasing the sleeve relative to the spindle.

2. In a stud welding gun, a housing, a sleeve positioned within the housing, an elongated spindle extending into the sleeve and movable relative to the sleeve and housing, circuit means connected to supply welding current through the spindle, spring means biasing the sleeve and spindle into predetermined operating relation, and electromagnetic clutch means including relatively movable clutch members of magnetic material secured to the spindle and sleeve and positioned on opposite sides of the spindle in juxtaposition, said clutch members being responsive to the flow of welding current through the spindle to lock the sleeve and spindle in fixed relation.

3. A stud welding gun comprising, a main body member having a longitudinal bore therein, a sleeve slidably positioned within the bore, a spring biasing the sleeve to one end of the bore, latch means operable to retain the sleeve in a predetermined position against the biasing force of the spring, an elongated spindle positioned in and movable longitudinally of said bore and projecting into the sleeve, conductor means connected to the spindle above the sleeve for supplying welding current through the spindle including the portion thereof in the sleeve, a pair of relatively movable clutch members of magnetic material positioned in juxtaposition within the sleeve, one of said clutch members being operatively connected to the spindle and the other to the sleeve, said clutch members being cooperative to lock the spindle relative to the sleeve upon the flow of welding current through the spindle.

4. Stud welding apparatus comprising, an axially movable stud holder, clutch means operable to effect engagement with the holder, actuating means applying a biasing force to actuate the clutch means axially of the holder, and retaining means actuable to retain the clutch means in a predetermined position against the force of the biasing means.

5. A stud welding gun comprising, a body member, an axially movable stud support extending into the body member, clutch means actuable axially of the support, spring means biasing the clutch means axially of the support, retracting means operable to bias the clutch means relative to the body member, and a pawl operable to retain the support and clutch means in predetermined relation to the body member against the biasing force of the retracting means, said pawl being actuable to release the clutch and support means from said predetermined relation with the body member.

6. In a stud welding gun, a housing having a handle at one end and a stand at the other, an axially movable conducting stud support extending through the housing, circuit means including a flexible connection for supplying electrical energy to the support so that it flows through the portion thereof within the housing, magnetic clutch means within the housing arranged to engage the support while welding current flows therethrough, and lock means carried by the housing actuable to lock the clutch means relative to the housing.

7. Stud welding apparatus comprising, a housing having a substantially cylindrical body portion with an aperture in one side and a reduced section at one end having an opening therein coaxial with the body portion, a sleeve slidably positioned within the body portion having end portions with openings aligned with the opening in the reduced section and having a recess in one side alignable with the aperture in the body portion when the sleeve is adjacent the reduced section, spring means within the body portion biasing the sleeve away from the reduced section, latch means slidable in the body aperture to enter the recess in the sleeve when it is aligned with the aperture, an elongated stud supporting spindle slidably positioned in the openings in the reduced section and end portions of the sleeve, conductor means connected to supply welding current to the stud through the spindle from the end remote from the stud, biasing means urging the spindle toward the reduced section relative to the sleeve, and clutch means comprising members of magnetic material disposed about a current conducting portion of the spindle so as to be responsive to the flow of welding current through the spindle to secure the spindle and sleeve in fixed relation during said flow.

8. Welding apparatus comprising, a housing having an axial opening, a current conducting spindle positioned and axially movable in the opening, clutch means movably positioned in the opening for engaging the spindle, spring means normally biasing the clutch means longitudinally of the spindle in one direction, additional spring means normally biasing the clutch means toward one end of the housing to retract the spindle from a workpiece, retaining means operable to retain the clutch means adjacent the other end of the housing, and magnetic release means operable to retract the retaining means and permit the additional spring means to retract the spindle from the work.

9. In a stud welding gun, a housing having a body with an axial bore having a reduced opening at one end and a handle at the other end, a clutch retainer positioned within the bore and movably longitudinally thereof, biasing means within the bore urging the clutch retainer toward the handle, a pawl slidable to engage the clutch retainer and maintain it in a predetermined position longitudinally of the bore, electromagnetic means operable to retract the pawl from engagement with the clutch retainer, an elongated current conducting spindle extending through the bore and the clutch retainer, and clutch means positioned in the retainer comprising a relatively fixed member of magnetic material secured to the retainer and partially surrounding the spindle on one side and a relatively movable member of magnetic material secured to and partially surrounding the spindle on the other side, said clutch members being cooperative by reason of magnetic attraction upon the passage of current through the spindle to secure the spindle relative to the clutch retainer.

10. A stud welding gun comprising, a housing having an axial bore and provided with a handle at one end and a reduced section at the other end having an axial opening of reduced size substantially coaxial with the bore, a stand adjustably secured to the reduced section to position the gun relative to a workpiece, a clutch retainer slidably positioned within the bore and having end openings aligned with the reduced axial opening of the housing, an elongated spindle of conducting material slidably positioned in the bore and reduced end opening and projecting therefrom, said spindle being spaced and insulated from the housing and having stud securing means on the end projecting from the reduced opening of the housing, circuit means for supplying welding current to the stud securing means through the spindle including the portion in said bore, spring means positioned on the spindle for biasing the spindle toward the workpiece relative to the clutch retainer, additional spring means biasing the clutch retainer toward the handle end of the bore, lock means operable to retain the clutch retainer in a predetermined position in the bore against the force of the additional spring means, operating means actuable to move the clutch retainer to said position, and magnetic clutch means in said retainer positioned in the field of magnetic flux produced about the spindle by the welding current operable to retain the spindle in predetermined relation to the retainer while welding current flows through the spindle.

KENNETH FREDERICK BARLOW.

REFERENCES CITED

The following references are of record in the file of this patent:

UNITED STATES PATENTS

| Number | Name | Date |
| --- | --- | --- |
| 2,260,969 | Crecca et al. | Oct. 28, 1941 |
| 2,265,169 | Hughes et al. | Dec. 9, 1941 |